Feb. 27, 1940.  H. H. BLAU  2,191,953
APPARATUS FOR MAKING HOLLOW GLASS BLOCKS
Filed Oct. 12, 1937
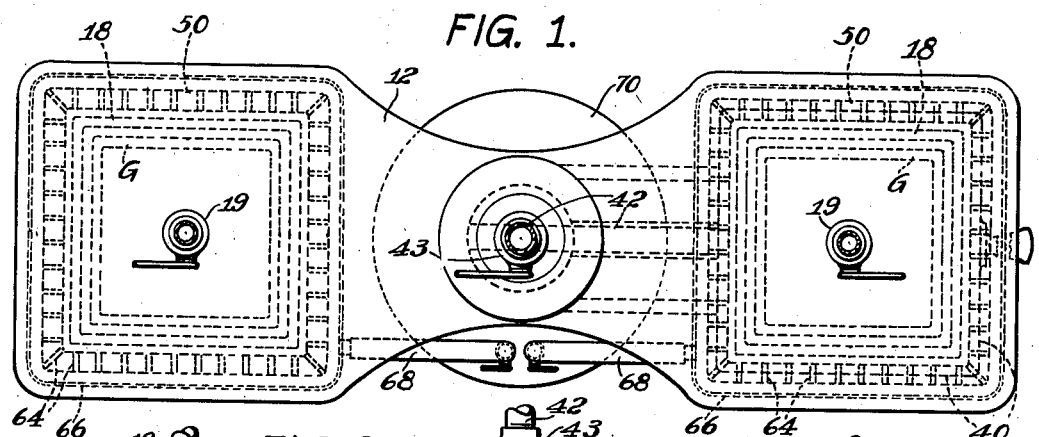
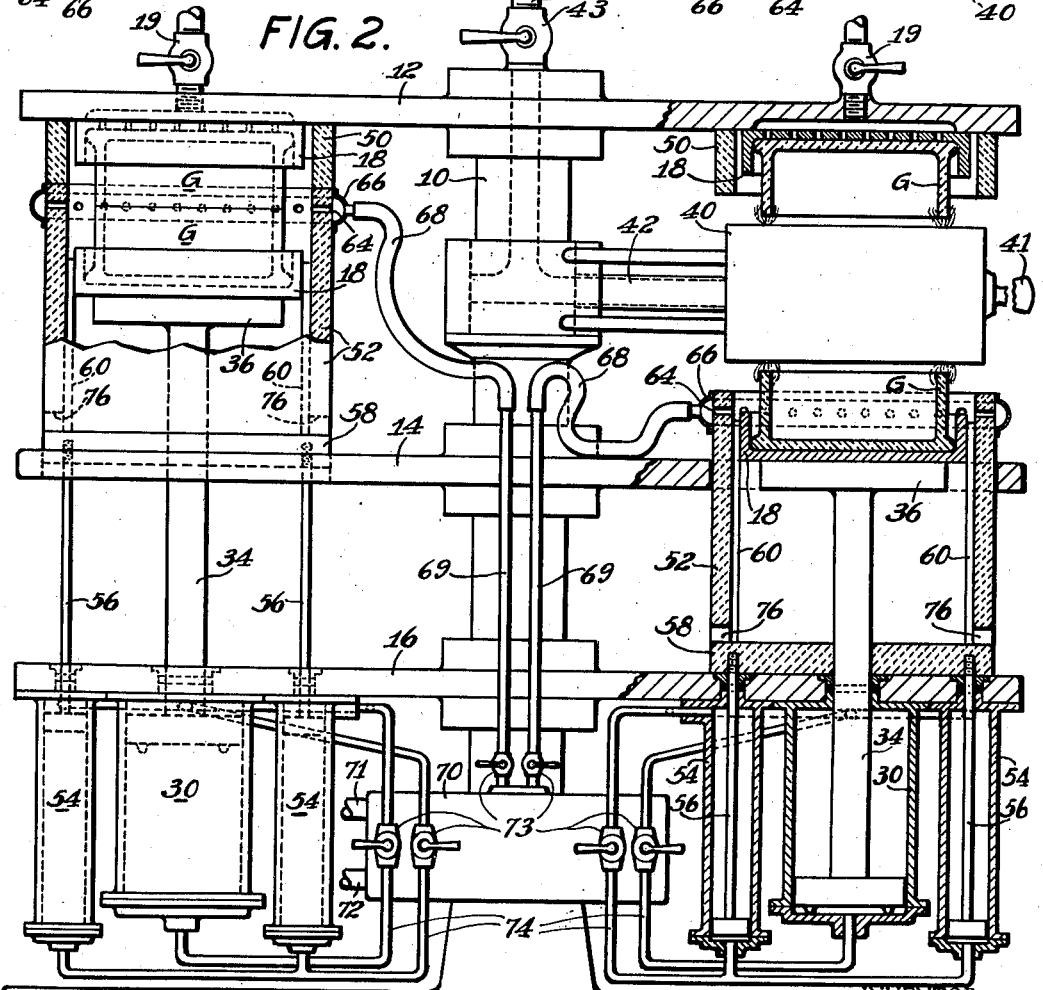

Patented Feb. 27, 1940

2,191,953

UNITED STATES PATENT OFFICE 2,191,953

APPARATUS FOR MAKING HOLLOW GLASS BLOCKS

Henry H. Blau, Charleroi, Pa., assignor to Corning Glass Works, Corning, N. Y., a corporation of New York Application October 12, 1937, Serial No. 168,636

5 Claims. (Cl. 49—1)

This invention broadly relates to improved apparatus for making sealed hollow glass articles of various kinds and is particularly concerned with apparatus for making glass building blocks, such as are finding a wide variety of structural uses in the hands of architects and builders in the construction of walls, partitions and the like.

Heretofore sealed hollow glass articles, as, for example, building blocks, have usually been made most successfully by press forming parts thereof in halves, each of which ordinarily has a relatively flat portion bounded by a right angle flange extending continuously around the flat portion. The flanges of the halves are heated and pressed together to form a hollow glass article. While under certain conditions satisfactory glass blocks or other articles can be made as described, a relatively large number of factors are involved which have been found to result in considerable scrap unless properly and carefully controlled. Particularly, it has been difficult heretofore to bring the flange portion of the glass parts to a fusing temperature by a gas flame and then press or stick the softened flanges together and in fused relation without either overheating or underheating the flanges with attending complications. Overheating of the flanges results in distortion of the articles during the heating, joining or lehr treating steps, and underheating of the flanges causes improper joinder of the glass parts so that a tight hollow article is not provided. Further, in known methods and apparatus when the flanges of the glass parts are heated to a sufficiently soft state for proper fusing together, the glass parts must be held in pressed and fused relation until the glass has set. This sometimes delays rapid production operations and entails scrap loss unless the parts are properly held until the glass is set. When the hot parts are held for any extended period before the zone or line of joinder of the parts sets or solidifies the hot gases entrapped in the block may blow out through a weak or extra hot portion of the zone of joinder of the parts and thereby spoil the block. Thus ordinary sealing methods limit the internal pressures which can be present in the sealed hollow articles under actual conditions of service and these in turn limit the weight of the walls and the practical sizes of the article faces. In addition, prior methods and apparatus are not particularly adapted to commercial production operations involving automatic machinery and uniform workmanship.

It is the general object of my invention to avoid and overcome the foregoing and other objections to known procedures and mechanisms by the provision of improved apparatus for rapidly and efficiently forming sealed hollow articles of glass from preformed parts and having desired internal pressures.

Another object of my invention is to provide positive control of the temperature and physical properties such as viscosity and surface tension of the glass parts to be joined together from the time of heating until after the parts have been completely joined and set, regardless of changes of temperature of equipment, of the atmosphere, drafts in the shop, and the like.

Another object of my invention is the provision of apparatus for heating the glass parts, such as halves to be joined together, means for holding the glass parts against loss of heat, means for pressing the parts together in fused relation while still soft and plastic from the heat, and means for rapidly cooling the zone or line of joinder of the parts.

Another object of my invention is the provision of improved means for cooling the line or zone of joinder of parts fused together to form a hollow glass article whereby the assembly of the parts is expedited.

Apparatus constructed in accordance with my invention and adapted to make hollow articles from preformed glass parts having complemental engaging portions includes means for holding the parts with the complemental portions exposed, means for heating the portions to be engaged to soften them, means for shielding the portions against loss of heat, means for moving the shielding means into position immediately after the heating means is withdrawn from the portions, means for pressing the portions of the parts together in fused relation to form a hollow article, means for directing a blast of cooling fluid against the line of joinder of the parts, and means for venting gas away from the parts during the cooling of the line of joinder thereof.

For a better understanding of my invention reference should be had to the accompanying drawing wherein Fig. 1 is a plan view of one form of apparatus constructed in accordance with my invention and adapted to practice the method of my invention; and Fig. 2 is a side elevation with certain portions thereof being broken away in vertical section to better illustrate the invention.

While my invention clearly contemplates the manufacture of sealed hollow glass articles of various types, sizes, weights and shapes, it is particularly beneficial in the production of hollow glass building blocks and has been so illustrated and will be so described. Again, although the method of my invention can be practiced with a wide variety of apparatus, as, for example, from a simple hand machine up to a complicated multi-station turret type of automatic apparatus, I have elected to illustrate my improved method in conjunction with a simple apparatus embodiment of my invention.

The particular apparatus embodiment of my invention shown in the drawing includes a stand or pedestal 10 which carries a plurality of tables 12, 14 and 16 for supporting the various parts of the apparatus. Secured to the under side of the table 12 and the upper side of the table 14 at equally spaced points from the pedestal 10 are a plurality, usually two pairs as shown, of holding members 18 for receiving the glass parts to be joined together. The members 18, and particularly the upper members, may comprise mechanical chucks but preferably are in the form of suction heads, whose operation is controlled by valves 19. The lower members 18 need not positively grip the glass parts, which are indicated at G, but may merely receive the parts and hold them in proper alignment.

The glass parts G to be united together to form a hollow block are first preformed as by pressing in other apparatus placed usually closely adjacent to the apparatus of my present invention. While still hot the parts are loaded into the holding members 18 of the present apparatus and are joined together as hereinafter described. Generally, as heretofore indicated, the glass parts G are pressed in halves each having a relatively flat portion bounded by an endless flange extending at right angles to the flat portion of the part. It should be understood, however, that complemental glass parts, regardless of their exact complemental shape, can be joined together to provide a sealed hollow block.

The holding members 18 which releasably support the glass part G are mounted in pairs which have the individual members in vertical alignment with each other. The lower holding member 18 of each pair is supported at the table 14 but is mounted for movement vertically of the table 14 so that the glass parts G can be brought together. This vertical movement of the lower glass part G can be achieved in any number of ways. Perhaps one of the simplest and most positive ways of accomplishing this is to secure an air motor 30, as illustrated on the bottom of the table 16, which motor includes a piston rod 34 fastened to a block 36 which is secured to the lower holding member 18.

A burner 40 is pivotally supported on the pedestal 10 so that the burner can be swung to either pair of holding members 18 by the operation of the handle 41. The burner has a plurality of jets or openings adapted to be positioned opposite the flanges of the glass parts G so that a mixture of gas and air or oxygen supplied to the burner by way of conduit 42 and control valve 43 heats the flanges to a fusing temperature, as shown at the right-hand side of Fig. 2.

An important part of my invention is the provision of means for shielding or holding each mating pair of the glass parts against loss of heat after the flange-softening operation and before the parts can be completely fused together and allowed to set. One manner of achieving the desired result is to provide a relatively short length of heat-insulating material 50 which is secured to the under side of the table 12 so as to surround the uppermost holding member 18 but terminating vertically above the lowermost portion of the flange of the glass part. The length of insulating material 50 can be of any cross section, such as round, square or the like to closely surround the glass part. Complemental to the length 50 of insulating material is a longer length of like material 52 which has the same cross section as the length 50. The length 52 is supported in a suitable opening in the table 14 for limited vertical movement which may be achieved in various ways but which can be readily accomplished by the provision of air motors 54 which are secured to the under side of table 16. Piston rods 56 extending from the air motors 54 are secured to a plate 58 to which the length 52 of insulating material is secured. Circumferentially spaced relatively narrow ribs 60 are provided at a plurality of points around the inner periphery of the length 52 of insulating material so that the lowermost holding member 18 is guided in its vertical movement without interfering with the discharge of hot gases down between the bars and the holding member 18 and the length 52, as hereinafter described.

Suitable means for cooling the line or zero of joinder of the parts after fusing are incorporated with the shielding means, and while these may obviously take a plurality of forms I have, in the embodiment of my invention illustrated, provided the upper end of the length 52 of heat-insulating material with a plurality of horizontally extending apertures 64 which are covered at the outer ends thereof by a manifold 66. The manifold 66 is connected by a flexible tube 68 to a conduit 69 running to a compressed air reservoir, indicated as a whole by the numeral 70. It will be understood that the reservoir 70 includes supply and exhaust conduits 71 and 72 and control valves 73 for the controlled hand operation of the several fluid-operated mechanisms. Specifically, the air motors 30 and 54 are controlled by the mechanism 70 and valves 73 and to this end air conduits 74 are provided, as will be understood.

The apparatus at the left-hand side of Fig. 2 shows the position of the glass parts during the joining operation. In this connection it will be noted that the length 52 of heat-insulating material has been raised up into engagement with the short length 50 so as to form a shield around the heated glass parts G. The heat shield is brought into position as soon as possible after the heating operation so that the temperature of the glass parts G is retained and the contacting edges of the glass flanges are maintained in a soft and plastic condition. Generally the portion 52 of the heat shield is raised into shielding position just as the burner 40 is moved out from between the glass parts and the portion 52 can be raised without striking the burner.

In the joining operation the air motor 30 is energized to raise the lower holder 18 upwardly to bring the heated flanges of the glass parts into contacting relation as shown at the left-hand side of Fig. 2. With the glass parts in contacting position the apertures 64 are in alignment with the line of joinder of the glass parts so that after the parts are pressed into fusing relation a blast of cooling fluid, generally air supplied by way of conduits 69 and 68, is directed against the line of joinder of the parts to cool them. The air displaced by the blast of cooling fluid can be vented to the atmosphere as desired. This may be accomplished, for example, by providing apertures 76 in the plate 58 so that the displaced air flows down around the lower cooling means 18 between the bearing bars 60 and out through the apertures 76.

In the operation of the apparatus just described a pair of the complemental press-formed glass parts or halves are positioned in the holding members 18 at the right-hand side of Fig. 2, and the burner 40 is revolved into heating position between the glass parts. The flanges of the glass parts G are now heated by the burner 40 to soften them and bring them to a plastic fusing condition. The burner 40 is now swung out from between the highly heated glass parts and the heat shield is closed around the glass parts by the operation of air motors 54 to protect the glass against loss of heat until joined together.

In the joining operation, which may be at any predetermined time interval after the heat shield has been raised into position, the lower holding means 18 is raised by operation of the air motor 30 to bring the glass parts together in pressed relation. Once the parts have been properly pressed into fused engagement the blast of cooling fluid is directed through the apertures 64 against the zone or line of joinder of the glass parts to rapidly cool or set the seam with the air displaced escaping through the apertures 76. I likewise contemplate flowing cooling fluid into the heat shield from the manifold 66 prior to bringing the glass parts together. In this manner the temperature, density and amount of gas trapped between the glass parts in the joining operation can be controlled. Thus the desired internal pressure in the finished article can be obtained by variation of the predetermined time interval after closing the heat shield and before joining the glass parts and/or by the flow of cooling fluid into the heat shield. Thus the method and apparatus of my invention greatly extend the scope of possible adjustment of pressures in the sealed glass product and permit, for example, making lower weight blocks without practical limitations of size of the block faces. Accordingly, it is possible to produce stronger glass building blocks of lower cost and better consumer acceptance and in which undesirable sub- or super-atmospheric pressures are not present.

Instead of supplying cooling fluid, such as air, to the heat shield as just described, I may fill the interior of the heat shield with a gas at the effective temperature of the glass parts prior to joining the parts together. When this is done there is no tendency to blow out the seal in the zone of joinder of the glass parts since the gas trapped within the sealed hollow article being produced is the same temperature as the glass parts.

After the zone of joinder of the glass parts has been cooled the heat shield 52 is dropped out of position, the lower holder 18 is moved to its lowermost position, and the glass block supported by the upper holder 18 is released upon a paddle or is transferred by tongs to a cooling lehr. It will be understood that in the operation of the apparatus while one pair of complemental glass parts is being heated by the burner 40 on one side of the apparatus a second pair of complemental glass parts on the other side of the apparatus and just heated by the burner is being sealed together as described. Thus the operation of the apparatus is substantially continuous with the burner 40 being swung from one side to the other.

From the foregoing it will be recognized that the objects of my invention have been achieved by the provision of improved means and methods for effectively controlling the sealing temperature of hollow glass blocks formed from a plurality of parts or halves fused together. My method and apparatus are capable of a wide variety of changes to provide exactly the type of fusing and setting operation required for commercial production purposes and to provide uniformly efficient hollow glass blocks, or as heretofore indicated, other sealed hollow articles of glass.

While in accordance with the patent statutes my invention has been illustrated and described in detail, it should be appreciated that the invention is not limited thereto or thereby but is defined in the appended claims.

I claim:

1. Apparatus for making sealed hollow building blocks of glass from preformed parts having upstanding endless flanges which comprises means for holding the parts with the flanges spaced apart, means movable relatively to the parts for heating the flanges to soften them, means for effecting relative movement between the heating means and the parts whereby the parts can be moved into engagement with each other, removable means completely surrounding the parts for shielding the flanges against loss of heat immediately after the heating means is withdrawn from the flanges, means for moving the shielding means to and from shielding position, means for pressing the flanges of the parts together in fused relation to form a hollow block after the parts have been surrounded by the shielding means for a predetermined time interval, and means for supplying fluid to the inside of the heat-shielding means.

2. Apparatus for making hollow building blocks of glass from press-formed parts having upstanding endless flanges which comprises means for holding the parts with the flanges in opposed alignment but spaced apart, means for simultaneously heating the flanges to soften them, means for moving the heating means to and from heating position, means for shielding the flanges against loss of heat, means for moving the shielding means into position immediately after the heating means is withdrawn from the flanges and for removing the shielding means after the parts are fused together, means for pressing the flanges of the parts together in fused relation to form a hollow block, means for directing a blast of cooling fluid uniformly against the zone of joinder of the parts, and means for venting gas out of the shielding means and away from the parts during the cooling of the zone of joinder thereof.

3. Apparatus for making hollow building blocks of glass from complemental pre-formed parts which comprises a heat shielded chamber, means for opening and closing the chamber, means in the chamber for supporting the complemental glass parts, means movable to and from heating position for heating at least the portions of the parts to be engaged, means for pressing the heated portions of the parts together when enclosed in the chamber to form a hollow block, means in the chamber for directing a blast of cooling fluid uniformly against the outside of the zone of joinder of the parts with the chamber closed, and means associated with the closed chamber for venting displaced fluid to the outside of the chamber.

4. Apparatus for making sealed hollow building blocks of glass from a plurality of parts comprising means for heating portions of the parts to soften them, means for effecting relative movement between the parts and the heating means to allow a clear path for movement of the parts together, means for pressing the portions of the parts together in fused relation to form a sealed hollow block, means for directing a blast of cooling fluid uniformly against only the sides and complete zone of joinder of the parts, and means for venting gas away from the parts during the cooling of the sides and zone of joinder thereof.

5. Apparatus for making sealed hollow building blocks of glass from a plurality of parts comprising means for heating the portions of the parts to soften them, means for completely surrounding the parts for shielding the portions against loss of heat, means for moving the shielding means from an open to a closed position and vice versa and for moving the heating means to and from heating position, means for pressing the portions of the parts together in fused relation to form a sealed hollow block while still shielded, and means for supplying fluid to the interior of the shielding means and around the outside of the article.

HENRY H. BLAU.